US006898286B2

(12) United States Patent
Murray

(10) Patent No.: US 6,898,286 B2
(45) Date of Patent: May 24, 2005

(54) METHOD AND SYSTEM VERIFYING PRODUCT LICENSES USING HARDWARE AND PRODUCT IDENTIFICATIONS

(75) Inventor: Douglas G. Murray, Johnson City, NY (US)

(73) Assignee: International Business Machines Corporation, Armonk, NY (US)

(*) Notice: Subject to any disclaimer, the term of this patent is extended or adjusted under 35 U.S.C. 154(b) by 853 days.

(21) Appl. No.: 09/740,368

(22) Filed: Dec. 19, 2000

(65) Prior Publication Data

US 2002/0112176 A1 Aug. 15, 2002

(51) Int. Cl.[7] .......................... H04N 7/167; G06F 12/14; H04L 9/12
(52) U.S. Cl. .......................... 380/202; 713/200; 705/59
(58) Field of Search ................................. 713/200, 155, 713/169; 380/201, 202; 705/57, 59

(56) References Cited

U.S. PATENT DOCUMENTS 5,113,518 A     5/1992  Durst, Jr. et al.
5,652,868 A     7/1997  Williams
5,864,620 A  *  1/1999  Pettitt .......................... 705/54
5,894,571 A     4/1999  O'Connor
5,944,821 A     8/1999  Angelo
6,006,190 A    12/1999  Baena-Arnaiz et al.
6,067,622 A     5/2000  Moore
6,260,141 B1 *  7/2001  Park .......................... 713/155

FOREIGN PATENT DOCUMENTS

WO      WO 98/420098     *  9/1998

* cited by examiner

Primary Examiner—Matthew Smithers
(74) Attorney, Agent, or Firm—William E. Schiesser; Hoffman, Warnick & D'Alessandro LLC

(57) ABSTRACT

The present invention provides a method and system for verifying software product licenses using hardware and product identifications. Specifically, the present invention provides a method and system for verifying multiple products using a verification file that is obtained/maintained separately from the product. The products are verified based upon specific end-users' computer systems, as opposed to the end-users themselves.

36 Claims, 4 Drawing Sheets

METHOD AND SYSTEM VERIFYING PRODUCT LICENSES USING HARDWARE AND PRODUCT IDENTIFICATIONS

BACKGROUND OF THE INVENTION

1. Field of the Invention

The present invention generally relates to a method and system for verifying software product licenses using hardware and product identifications. More particularly, the present invention provides a method and system for verifying multiple software product licenses in a secure manner using a verification file that is maintained separately from the software products themselves.

2. Background Art

As the use of computer software becomes more prolific, the need to prevent piracy increases. In particular, software producers are constantly faced with growing instances of illegal usages of their products. To help better control the use of programs, most software producers include a license with their products, commonly known as a "shrink-wrap" license. Oftentimes, the license is accompanied by a verification code or key. When installing and/or running the product, an end-user is prompted to input the provided verification code. Upon input of the proper code, the product is consider "verified" and installation/running of the product on the end-user's computer system is permitted. However, much illegal use of software products stems from end-users who obtain products from lawful purchasers and then install or run the products on their own computer systems. When obtaining a product in this manner, the illegal end-user is also provided with the license and verification code. Accordingly, although not a lawful user, the individual is still free to input the proper verification code and install the product.

Heretofore, attempts have been made at improving the means by which software products can be verified. However, such attempts fail to provide an effective way by which a product can be licensed and verified based on a specific computer system, as opposed to a specific end-user. In addition, previous attempts fail to provide a way by which multiple products can be verified with a single verification file that is maintained separately from the products themselves.

In view of the above, there exists a need for an efficient method and system for verifying product licenses using computer hardware and product identifications. In addition, a need exists for such identifications to be stored in a verification file that is obtained/maintained separately from the product itself. A need also exists for the capability to verify multiple products using a single verification file or unit of files. A further need exists for the verification file to be encrypted prior to its use to prevent piracy.

SUMMARY OF THE INVENTION

The present invention overcomes the drawbacks of the related art by providing a method and system for verifying product licenses using hardware and product identifications. In addition, the present invention provides a verification file that is obtained/maintained separately from the product itself. Moreover, the verification file of the present invention can contain multiple product and hardware identification so that multiple products can be verified using a single verification file or unit of files. The verification file of the present invention is also encrypted prior to its use to prevent piracy.

According to a first aspect of the present invention, a method for verifying product licenses using hardware and product identifications is provided. The method comprises the steps of: (1) providing a computer hardware component; (2) accessing a verification file, wherein the verification file includes a plurality of product identifications and hardware identifications; and (3) comparing the plurality of hardware identifications with a corresponding hardware identification stored on the hardware component.

According to a second aspect of the present invention, a method for verifying product licenses using hardware and product identifications is provided. The method comprises the steps of: (1) providing a processor; (2) installing a verification application on the processor; (3) locating a verification file with the verification application, wherein the verification file includes at least one processor identification and at least one product identification; and (4) comparing the at least one verification file processor identification with a corresponding processor identification stored on the processor.

According to a third aspect of the present invention, a system for verifying product licenses using hardware and product identifications is provided. The system comprises: (1) an access system for accessing a verification file, wherein the verification file includes a hardware identification and a product identification; (2) a comparison system for comparing the hardware identification of the verification file with a corresponding hardware identification on a computer hardware component; (3) a registry system for registering license information in a registry; and (4) a log system for logging hardware information in a log.

According to a fourth aspect of the present invention, a system for verifying product licenses using hardware and product identifications is provided. The system comprises: (1) a computer hardware component; (2) a verification file having a plurality of hardware identifications and product identifications; (3) an access system for accessing the verification file; and (4) a comparison system for comparing the verification file hardware identifications with a corresponding hardware identification stored on the hardware component, and for comparing the verification file product identifications with a corresponding product identification of a product being installed on the hardware component.

According to a fifth aspect of the present invention, a program product stored on a recordable media for verifying product licenses using hardware and product identifications is provided. When executed the program product comprises: (1) an access system for accessing a verification file, wherein the verification file include a hardware identification and a product identification; (2) a comparison system for comparing the hardware identification of the verification file with a corresponding hardware identification on a computer hardware component; (3) a registry system for registering license information in a registry; and (4) a log system for logging hardware information in a log.

It is therefore an advantage of the present invention to provide a method and system whereby software products can be verified based upon a specific computer system, as opposed to a specific end-user. It is a further advantage of the present invention to provide a single verifications file (or unit of linked files) for verifying multiple product licenses, which is maintained separately from the programs.

BRIEF DESCRIPTION OF THE DRAWINGS

These and other features and advantages of this invention will be more readily understood from the following detailed description of the various aspects of the invention taken in conjunction with the accompanying drawings in which.

Figure 1:
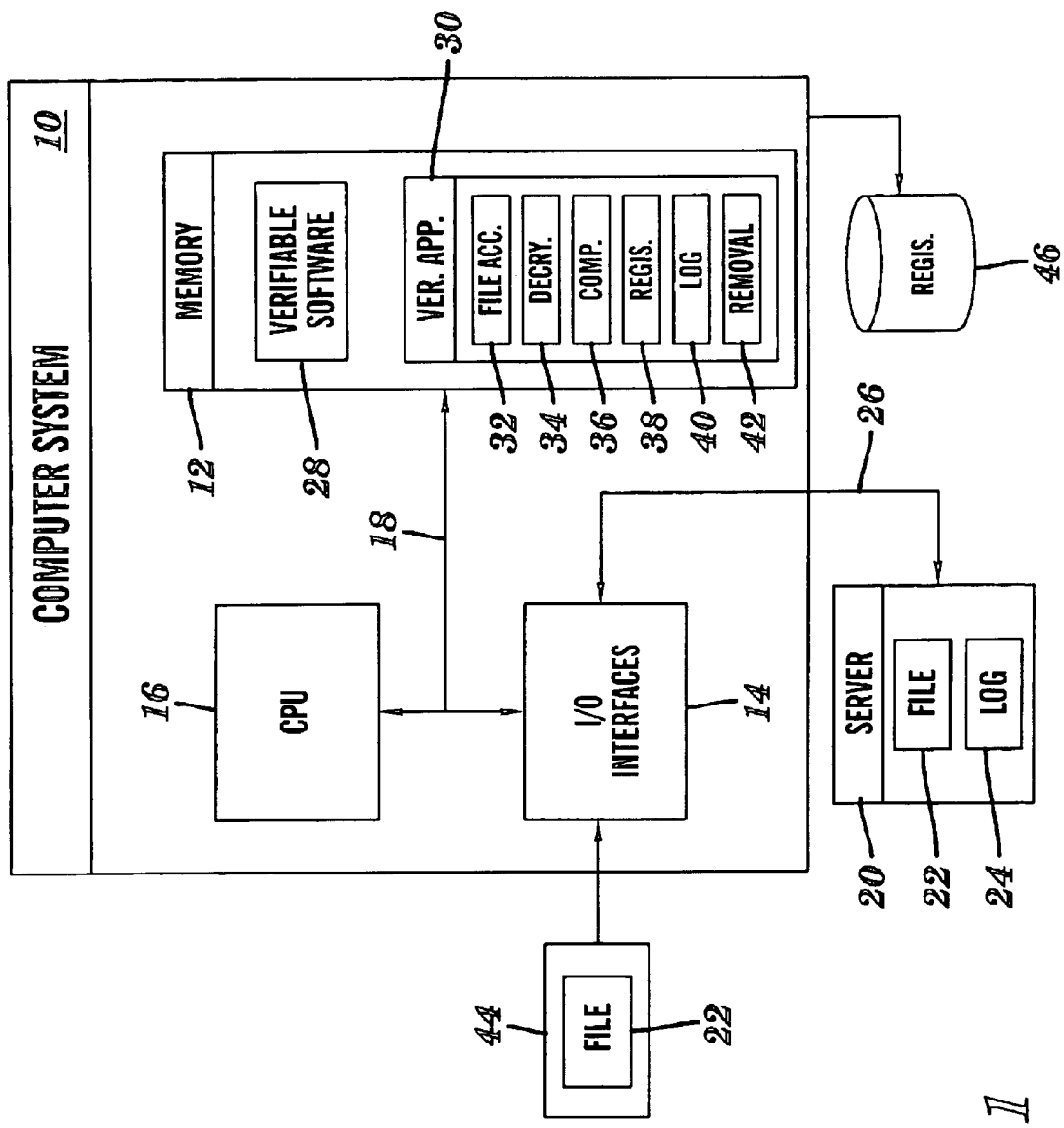
FIG. 1 depicts a computer system having a verification application, according to the present invention.

It is noted that the drawings of the invention are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements between the drawings.

DETAILED DESCRIPTION OF THE INVENTION

The present invention generally comprises a method and system for verifying a computer software product based upon a particular computer system, as opposed to a specific end-user. The method and system include a verification file that contains a list of software product identifications and corresponding hardware identifications to indicate the specific computer systems on which installation/running of the programs is permitted. When a product is being installed or run on an end-user's computer system, the verification file is accessed and the identifications in the file are compared with corresponding identifications for the end-user's computer and the product being installed.

Referring now to FIG. 1, a computer system 10 depicting the verification application 30 of the present invention is shown. The computer system 10 generally comprises memory 12, input/output interfaces 14, a central processing unit (CPU) 16, bus 18 and registry 46. Memory 12 may comprise any known type of data storage and/or transmission media, including magnetic media, optical media, random access memory (RAM), read-only memory (ROM), a data cache, a data object, etc. Moreover, memory 12 may reside at a single physical location, comprising one or more types of data storage, or be distributed across a plurality of physical systems in various forms. CPU 16 may likewise comprise a single processing unit, or be distributed across one or more processing units in one or more locations, e.g., on a client and server.

I/O interfaces 14 may comprise any system for exchanging information from an external source. Bus 18 provides a communication link between each of the components in the server system 10 and likewise may comprise any known type of transmission link, including electrical, optical, wireless, etc. In addition, although not shown, additional components, such as external devices (CRT, LED screen, hand held device, keyboard, mouse, voice recognition system, speech output system, printer, facsimile, pager, personal digital assistant, etc.), cache memory, communication systems, system software, etc., may be incorporated into computer system 10.

Registry 46, as further described below, is a database that stores verification information. Registry 46 may comprise one or more storage devices, such as a magnetic disk drive or an optical disk drive. In another preferred embodiment, registry 46 includes data distributed across, for example, a local area network (LAN), wide area network (WAN) or a storage area network (SAN) (not shown). Registry 46 may also be configured in such a way that one of ordinary skill in the art may interpret it to include multiple databases.

Stored in memory 12 is verification application 30 (shown in FIG. 1 as a software product). Verification application 30 will be described in more detail below but generally comprises a method and system for verifying a software product 28. Specifically, verification application 30 preferably includes: verification file access system 32, decryption system 34, comparison system 36, registry system 38, log system 40 and removal system 42. It should be appreciated, however, that although a specific embodiment of the verification application 30 is depicted, other variations may exist. For example, registry and log systems 38 and 40 may be a single system.

As will be further described below, to verify a software product 28, a verification file 22 must be accessed. The verification file 22 is preferably maintained separately from the software product 28 and can be provided on a recordable media 44 (e.g., diskette, CD-ROM, etc.) or can reside on a server 20. In the case of the former, the verification file 22 is preferably accessed from a drive of the computer system 10. In the case of the latter, the verification file 22 is accessed from the server 20 via communications network 26. Communications network 26 can include a direct terminal connected to the computer system 10, or a remote workstation in a client-server environment. In the case of the latter, the client and server may be connected via the Internet, wide area networks (WAN), local area networks (LAN) or other private networks. The server and client may utilize conventional token ring connectivity for WAN, LAN, or other private networks, or Ethernet, or other conventional communications standards. Where the client is connected to the system server via the Internet, connectivity could be provided by conventional TCP/IP sockets-based protocol. In this instance, the client would utilize an Internet service provider outside the system to establish connectivity to the system server within the system.

It is understood that the present invention can be realized in hardware, software, or a combination of hardware and software. The computer system 10 according to the present invention can be realized in a centralized fashion in a single computerized workstation, or in a distributed fashion where different elements are spread across several interconnected computer systems (e.g., a network). Any kind of computer system—or other apparatus adapted for carrying out the methods described herein—is suited. A typical combination of hardware and software could be a general purpose computer system with a computer program that, when loaded and executed, controls the computer system 10 such that it carries out the methods described herein. Alternatively, a specific use computer, containing specialized hardware for carrying out one or more of the functional tasks of the invention could be utilized.

The present invention can also be embedded in a computer program product, which comprises all the features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

Figure 2:
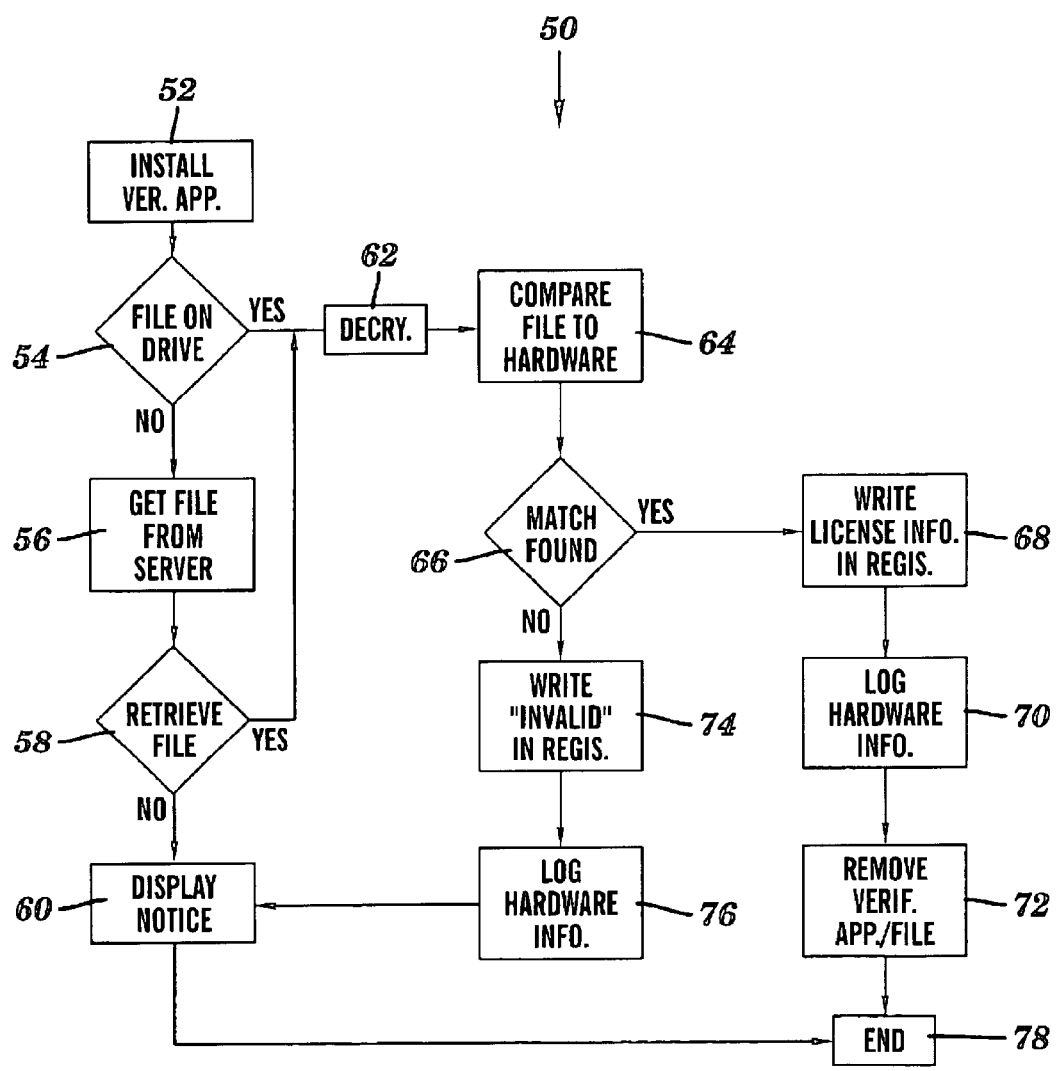
FIG. 2 depicts a logical flow chart of the verification application of FIG. 1.

Referring also now to FIG. 2, a logical flow chart 50 of the method and system of the present invention is depicted. To verify a software product 28, an end-user must first install and run the verification application 52. In a preferred embodiment, the verification application is installed as part of the installation procedure for the product. Specifically, when the end-user attempts to install the product, the verification application 30 will be installed and run on the end-users' computer system. By making the verification application 30 an integral part of product installation, the end-user is forced to verify the product license using the method described herein.

Once installed, the verification application 30 will attempt to access the verification file 22. Verification file 22 contains a list of computer hardware identifications and software program identifications. The hardware identifications correspond to particular end-user computer systems and serve to correlate specific product identifications with a particular computer system. For example, if XYZ, Inc. purchased 10 copies of Microsoft Windows 98®, the verification would include 10 unique product identifications (one for each copy of Windows 98®) and 10 computer hardware identifications that correspond to the specific computer systems on which each copy of Windows 98® is permitted to be installed. An example of the verification file is as follows:

| PRODUCT IDENTIFICATION | HARDWARE IDENTIFICATION |
|---|---|
| 123ABC | AB1 |
| 123CDE | AB2 |
| 123EFG | AB3 |
| 123GHI | AB4 |
| 123JKL | AB5 |
| 345ABC | AB6 |
| 345CDE | AB7 |
| 345EFG | AB8 |
| 345GHI | AB9 |
| 345JKL | AB0 |

Thus, each specific product is correlated or linked with a specific end-user's computer system, as opposed to a specific end-user. This prevents the same end-user from installing the same product on multiple computer systems or giving the product to other individuals for installation on their computer systems. The product identification is preferably a unique serial number or verification code assigned to each product by its producer. The hardware identification can be any serial number or the like that is unique to the hardware of a particular computer system. For example, the hardware identification can be a processor identification, a computer serial number, a CD-ROM serial number, etc. It should be understood that although the verification file 22 preferably contains multiple hardware and product identifications, any quantity could exist. For example, the verification file may contain only one product and hardware identification. Moreover, it should be understood that as used herein, verification file 22 pertains to one single file or several files linked as one unit. In either case, the present invention allows for multiple products to be verified using one single file or one unit of files.

As indicated, above, the verification file should be maintained separately from the product and verification application. This forces each end-user to obtain the verification file 22 separately. In one embodiment, the verification file 22 may reside on a recordable media 44 that is provided to the end-user. Accordingly, file access system 32 of the verification application 30 will attempt to read the drives 54 on the end-user's computer system to locate and access the verification file 22. If the verification file 22 was not provided on a recordable media, file access system 32 will access the server 56 (as preferably maintained by the software producer) to obtain and access the file 22. If the verification file is not available for retrieval at the server 58, a warning notice will be displayed 60 and the verification application will end 78.

Whether read from a drive of the end-user's computer system 54 or retrieved from the server 58, the verification file 22 is preferably encrypted. Encryption of the file 22 prevents unauthorized use thereof and is a well known concept in the art. Encryption of the verification file 22 is preferably accomplished in the following unique steps: (1) selecting an encryption key having any length; (2) formatting the key (replicating and/or truncating) to equal the length of the data set within the verification file; (3) setting pre-determined bits of the formatted key to zero to yield a masked key (preferably by forming an AND result of the key with binary 0000 1111); and (4) forming an exclusive-OR result of the data set with the masked key to yield an encrypted verification file.

Once the encrypted verification file is obtained, it must be decrypted 62 by the decryption system 34 so that it can be read and used to verify the software product. Assuming the verification file 22 was encrypted using the above-referenced steps, decryption can occur by forming an inverse exclusive-OR result of the encrypted verification file with the masked key.

After decryption 62 of the verification file 22, the identifications stored therein will be compared to a corresponding identification of the end-user's computer hardware 64 for a particular software product. For example, referring back to the chart above, if an end-user was attempting to install product identification 123ABC, the comparison system would compare the corresponding hardware identification in the verification file (AB1) to that of the computer system on which the product was being installed. As will be further described below, the product identification and end-user's hardware identification could be automatically read from the installed product and computer system, or could be manually inputted by the end-user.

If no match was found 66, installation of the product would not be permitted and an "invalid" message would be written in the registry 46 of the end-user's computer system 74. This message in the registry creates a record in the end-user's own computer system that the end-user tried to improperly install product 123ABC. After writing in the registry 74, the hardware information (e.g., hardware identification) for the end-user's computer system would then be transmitted 76 to log 24 and a warning notice or the like would be displayed 60. Because the log 24 is preferably maintained at the server 20 by the software producer, the producer now has a record that an end-user was attempting to improperly install product 123ABC on computer system AB1 and can take any appropriate action.

If, upon comparing the hardware identifications, it is determined that a match does exist 66, installation of the product would be permitted and license information would be written in the registry of the computer system 68. License information may include a license serial number, license duration and conditions of product use. Then, the hardware information would be transmitted 70 to log 40. Once transmitted, the verification file could be updated to indicate that product 123ABC has been successfully installed on computer system AB1 and is no longer available for installation. Accordingly, the product could not be installed on other computer systems.

As indicated above, comparison system preferably automatically reads the hardware and product identifications from the computer system. In an alternative embodiment, the end-user could manually input the identifications. In the case of the latter, an end-user may improperly install the product on a non-licensed computer system by inputting the identification for the licensed computer system. However, in this case, the log would be updated to reflect that the particular product has been installed. Thus, the product could never be installed on another computer system (not even the licensed computer system). Although not installed on the licensed computer system, only one installation of the product would be permitted.

Once the log has been updated, the verification application and/or verification file would be removed from the computer system 72 and the verification process is complete 78. Thus, only the installed software product remains on the computer system. It should be appreciated that the verification application could remain on the end-user's computer system if the software producer wishes to verify the product every time the product is executed/run. For example, if an end-user installed Microsoft Windows 98® on his/her computer system, the above-described verification process could be initiated at every start-up. If it is determined that the product is not legally installed on the computer system (e.g., the license has expired), the entire product could be removed by removal system 42.

Figure 3:
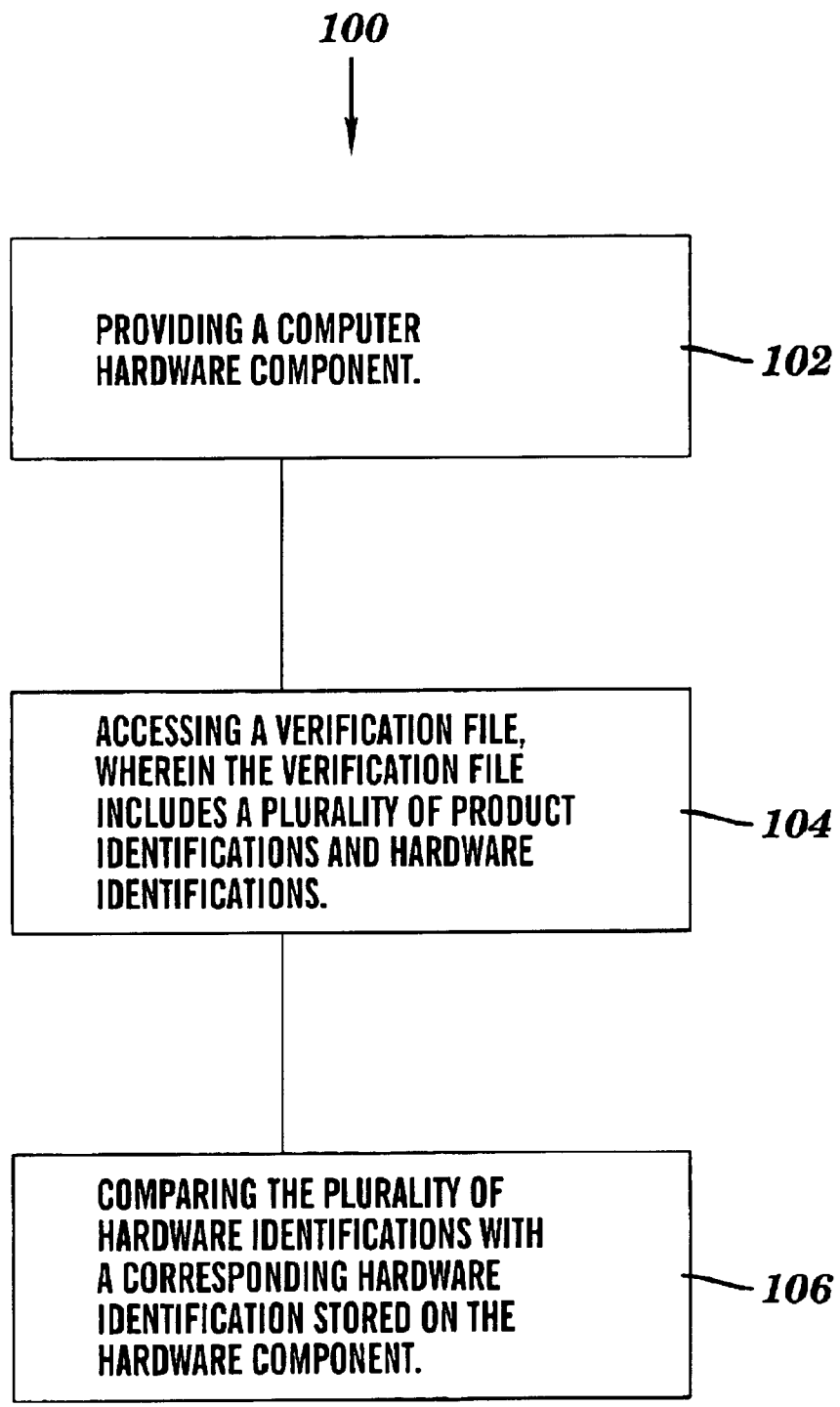
FIG. 3 depicts a first method flow chart, according to the present invention.

Referring now to FIG. 3 a flow chart of a first method 100 according to the present invention is shown. As depicted, the first step 102 of the method 100 is to provide a computer hardware component. The second step 104 is to access a verification file, wherein the verification file includes a plurality of product identifications and hardware identifications. The third step 106 of method 100 is to compare the plurality of hardware identifications with a corresponding hardware identification stored on the hardware component.

Figure 4:
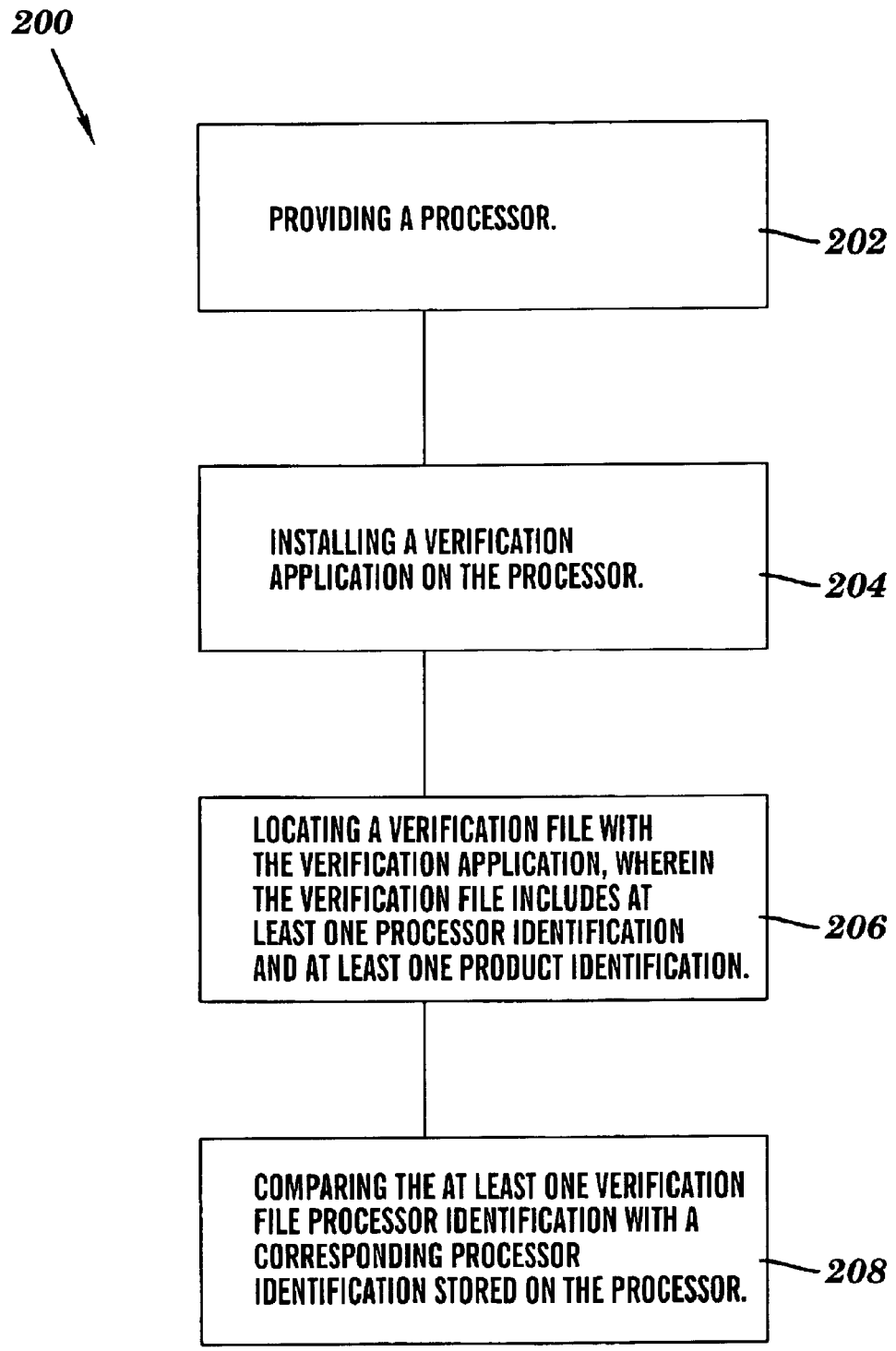
FIG. 4 depicts a second method flow chart, according to the present invention.

Referring to FIG. 4, a flow chart of a second method 200 according to the present invention is shown. The first step 202 of method 200 is to provide a processor. The second step 204 is to install a verification application on the processor. The third step 206 of method 200 is to locate a verification file with the verification application, wherein the verification file includes at least one processor identification and at least one product identification. The fourth step 208 is to compare the at least one verification file processor identification with a corresponding processor identification stored on the processor.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A method for verifying product licenses using hardware and product identifications, comprising the steps of:
   providing a computer hardware component;
   accessing a verification file, wherein the verification file includes a plurality of product identifications and a plurality of hardware identifications, which correspond to particular end-user computer systems; and
   comparing, during installation of a product, the plurality of hardware identifications with a corresponding hardware identification stored on the hardware component.

2. The method of claim 1, further comprising writing license information in a registry of the hardware component separate from the verification file if a match exists between the plurality of hardware identifications and the corresponding hardware identification stored on the hardware component and writing a message indicating an invalid installation attempt in the registry if a match does not exist between the plurality of hardware identifications and the corresponding hardware identification stored on the hardware component.

3. The method of claim 2, further comprising logging the hardware identification in a log maintained by a producer of the product and logging a message indicating an invalid installation attempt in the log if a match does not exist between the plurality of hardware identifications and the corresponding hardware identification stored on the hardware component.

4. The method of claim 3, wherein the logging step comprises logging the hardware identification on a server.

5. The method of claim 1, wherein the verification file is encrypted, and wherein the encrypted verification file is decrypted prior to the comparing step.

6. The method of claim 1, further comprising installing a program on the hardware component when a match is established between the compared hardware identifications for a particular program identification associated with the program.

7. The method of claim 1, wherein the hardware component is a processor, and wherein the hardware identification is a processor identification.

8. The method of claim 1, further comprising:
   installing a verification application on the hardware component; and
   using the verification application to access the verification file.

9. The method of claim 8, further comprising removing the verification application, after the comparison step.

10. The method of claim 1, wherein the accessing step comprises downloading an encrypted verification file from a server, prior to the comparing step.

11. The method of claim 1, wherein the accessing step comprises accessing an encrypted verification file from a drive associated with the hardware component.

12. A method for verifying product licenses using hardware and product identifications, comprising the steps of:
   providing a processor;
   installing a verification application on the processor;
   locating a verification file with the verification application, wherein the verification file includes at least one processor identification and at least one product identification; and
   comparing, during installation of a product, the at least one verification file processor identification with a corresponding processor identification stored on the processor.

13. The method of claim 12, further comprising:
   writing license information in a registry of the processor separate from the verification file if a match exists between the verification file processor identification and the corresponding processor identification stored on the processor;
   writing a message indicating an invalid installation attempt to the registry if a match does not exist between the verification file processor identification and the corresponding processor identification stored on the processor;

logging processor information in a log maintained by a producer of the product;

logging a message indicating an invalid installation attempt in the log if a match does not exist between the verification file processor identification and the corresponding processor identification stored on the processor; and removing the verification application from the processor.

14. The method of claim 13, wherein the processor information comprises the processor identification.

15. The method of claim 12, further comprising installing the product when a match exists between the verification file processor identification and the corresponding processor identification stored on the processor.

16. The method of claim 12, wherein the locating step comprises searching with the verification application for a verification on a drive associated with the processor.

17. The method of claim 12, wherein the locating step comprises searching with the verification application for a verification on a network server.

18. The method of claim 12, wherein the verification file is encrypted, and wherein the encrypted verification file is decrypted prior to the comparing step.

19. The method of claim 12, wherein the verification file includes a plurality of processor identifications, which correspond to particular end-user computer systems, and a plurality of program identifications.

20. A system for verifying product licenses using hardware and product identifications, comprising:

an access system for accessing a verification file, wherein the verification file includes a hardware identification and a product identification;

a comparison system for comparing, during installation of a product, the hardware identification of the verification file with a corresponding hardware identification on a computer hardware component;

a registry system for registering license information in a registry separate from the verification file if a match exists between the verification file identification and the corresponding processor identification and for writing to the registry a message indicating an invalid installation attempt if a match does not exist between the verification file identification and the corresponding processor identification; and a log system for logging hardware information in a log maintained by a producer of the product and for logging a message indicating an invalid installation attempt in the log if a match does not exist between the verification file processor identification and the corresponding processor identification stored on the processor.

21. The system of claim 20, wherein the comparison system further compares the product identification of the verification file with a corresponding product identification of a product being installed on the hardware component.

22. The system of claim 20, wherein the hardware component is a processor, and wherein the hardware identification is a processor identification.

23. The system of claim 20, wherein the verification file is accessed from a drive associated with the hardware component.

24. The system of claim 20, wherein the verification file is accessed from a network server.

25. The system of claim 20, wherein the verification file is encrypted, and wherein the system further comprises a decryption system for decrypting the encrypted verification file.

26. A system for verifying product licenses using hardware and product identifications, comprising:

a computer hardware component;

a verification file having a plurality of hardware identifications, which correspond to particular end-user computer systems, and product identifications;

an access system for accessing the verification file; and a comparison system for comparing, during installation of a product, the verification file hardware identifications with a corresponding hardware identification stored on the hardware component, and for comparing, during installation of a product, the verification file product identifications with a corresponding product identification of a product being installed on the hardware component.

27. The system of claim 26, further comprising:

a registry system for registering license information in a registry of the hardware component separate from the verification file if a match exists between the verification file identifications and the corresponding hardware identification and between the verification file product identifications and the corresponding product identification and for writing to the registry a message indicating an invalid installation attempt if a match does not exist between the verification file identifications and the corresponding hardware identification and between the verification file product identifications and the corresponding product identification;

a log system for logging hardware information in a log maintained by a producer of the product and for logging a message indicating an invalid installation attempt in the log if a match does not exist between the verification file processor identifications and the corresponding hardware identification stored on the processor or product and between the verification file product identifications and the corresponding product identification; and a decryption system for decrypting the verification file.

28. The system of claim 27, wherein the log is on a server.

29. The system of claim 26, wherein the verification file is accessed from a drive associated with the hardware component.

30. The system of claim 26, wherein the verification file is accessed from a network server.

31. A program product stored on a recordable media for verifying product licenses using hardware and product identifications, which when executed, comprises:

an access system for accessing a verification file, wherein the verification file include a hardware identification and a product identification;

a comparison system for comparing, during installation of a product, the hardware identification of the verification file with a corresponding hardware identification on a computer hardware component;

a registry system separate from the verification file for registering license information in a registry if a match exists between the verification file identification and the corresponding hardware identification and for writing a message indicating an invalid installation attempt to the registry if a match does not exist between the verification file identification and the corresponding hardware identification; and a log system for logging hardware information in a log maintained by a producer of the product and for logging a message indicating an invalid installation attempt in the log if a match does not exist between the verification file processor identification and the corresponding processor identification stored on the processor.

32. The program product of claim 31, wherein the comparison system further compares the product identification of the verification file with a corresponding product identification of a product being installed on the hardware component.

33. The program product of claim 31, wherein the hardware component is a processor, and wherein the hardware identification is a processor identification.

34. The program product of claim 31, wherein the verification file is accessed from a drive associated with the hardware component.

35. The program product of claim 31, wherein the verification file is accessed from a network server.

36. The program product of claim 31, wherein the verification file is encrypted and wherein the system further comprising a decryption system for decrypting the encrypted verification file.

* * * * *